United States Patent
Birkner et al.

(10) Patent No.: US 6,582,194 B1
(45) Date of Patent: Jun. 24, 2003

(54) GAS-TURBINE BLADE AND METHOD OF MANUFACTURING A GAS-TURBINE BLADE

(75) Inventors: Jens Birkner, Essen (DE); Knut Halberstadt, Mülheim a.d. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/515,177

(22) Filed: Feb. 29, 2000

Related U.S. Application Data

(63) Continuation of application No. PCT/DE98/02349, filed on Aug. 13, 1998.

(30) Foreign Application Priority Data

Aug. 29, 1997 (DE) .......................................... 197 37 845

(51) Int. Cl.$^7$ ................................................ F03D 11/02
(52) U.S. Cl. ................................ 416/97 R; 416/241 R; 415/115; 415/200
(58) Field of Search ................................ 416/97 R, 96 R, 416/96 A, 97 A, 241 B, 241 R; 415/116, 115, 200

(56) References Cited

U.S. PATENT DOCUMENTS

| | | | |
|---|---|---|---|
| 4,695,247 A | | 9/1987 | Enzaki et al. |
| 4,768,700 A | | 9/1988 | Chen |
| 5,139,824 A | * | 8/1992 | Liburdi et al. ............... 427/252 |
| 5,217,757 A | * | 6/1993 | Milaniak et al. ............ 427/253 |
| 5,264,245 A | * | 11/1993 | Punola et al. ................ 427/237 |
| 5,292,594 A | * | 3/1994 | Liburdi et al. ............... 428/650 |
| 5,328,331 A | | 7/1994 | Bunker et al. |
| 5,392,515 A | | 2/1995 | Auxier et al. |
| 5,640,767 A | | 6/1997 | Jackson et al. |
| 5,702,232 A | * | 12/1997 | Moore ....................... 416/97 R |
| 5,820,337 A | * | 10/1998 | Jackson et al. ............ 416/97 R |
| 6,254,334 B1 | * | 7/2001 | LaFleur ..................... 416/97 R |

FOREIGN PATENT DOCUMENTS

EP 0 742 347 A2 11/1996

OTHER PUBLICATIONS

International Patent Application WO 97/05299 (Czech et al.), dated Feb. 13, 1997.
G. Kienel: "PVD–Verfahren und ihre Anwendung zur Herstellung verschleiss–hemmender Schichten", ZwF 77 (1982 1, pp. 43–48, PVD methods and their use for producing wear and tear resistant layers.
"Blad Cladding Aids Cooling", Machine Design, Feb. 21, 1985, p. 78.
James R. Dobbs et al.: "Advanced Airfoil Fabrication" in Superalloys 1996, pp. 523–529.

* cited by examiner

Primary Examiner—Edward K. Look
Assistant Examiner—James M McAleenan
(74) Attorney, Agent, or Firm—Laurence A. Greenberg; Werner H. Stemer; Ralph E. Locher

(57) ABSTRACT

The invention relates to a method of manufacturing a gas-trubine blade and to a turbine blade. First, a hollow, supporting metal blade body is made, in particular by casting, with a multiplicity of, in particular peg-like, elevations on an outer surface of a blade airfoil of the metal blade body. Impact cooling bores are bored between the elevations from the outer surface to the hollow interior space of the metal blade body. A coating is applied which fills the intermediate spaces between the elevations and closes the impact cooling bores. The coating is made of a heat-resistant, removable material. Then, a covering coat is adhered to the metallically bright top sides of the elevations, and the material in the intermediate spaces between the elevations of the metal blade body and the covering coat is then removed.

22 Claims, 2 Drawing Sheets

GAS-TURBINE BLADE AND METHOD OF MANUFACTURING A GAS-TURBINE BLADE

CROSS-REFERENCE TO RELATED APPLICATION

This is a continuation of copending international application PCT/DE98/02349, filed Aug. 13, 1998, which designated the United States.

BACKGROUND OF THE INVENTION

1. Field of the Invention

The invention relates to a gas-turbine blade and to a method of manufacturing a gas-turbine blade.

Gas-turbine blades comprising a hollow, supporting metal blade body having a multiplicity of integrally cast or worked-in groove-shaped cooling passages, onto which a thin outer skin is applied by electron-beam vaporization or plasma spraying, are known, for example, from U.S. Pat. No. 5,640,767. The cooling effect of the air cooling is to be improved with these gas-turbine blades. The underlying premise is that the cooling effect becomes better and better as the thickness of the blade wall decreases. However, if the thickness of the supporting blade wall is reduced, this is accompanied by a marked loss in the strength of the component.

The application of a thin outer skin by electron-beam vaporization or plasma spraying is described in *Superalloys* 1996 under the title "Advanced Airfoil Fabrication", pages 523–29. That disclosure constitutes an improvement compared with attempts to cast a double-walled blade in which the inner, thick wall absorbs the force impacts and in which the outer, thin wall merely constitutes an aerodynamically favorable envelope which can be readily cooled. Such blades are costly to manufacture and do not enable a favorable ratio to be achieved between the thickness of the inner, supporting wall and the outer, thin wall, so that the improvement in the cooling effect is only slight.

The cooling effect achieved with the method described in the paper "Advanced Airfoil Fabrication" and with the gas-turbine blades resulting therefrom is not optimal. This is due to the fact that the flow resistance in the groove-shaped cooling passages is high and only inner cooling takes place through these groove-shaped cooling passages. Such a turbine blade is also described in U.S. Pat. No. 5,640,767.

A cooled gas-turbine blade is described in U.S. Pat. No. 5,392,515. There, cooling pockets are provided on the outside of a wall enclosing a hollow space and are connected to the hollow space via passages for the cooling-air feed.

2. Summary of the Invention

The object of the invention is to provide a gas turbine blade and a method of manufacturing a turbine blade which overcomes the above-noted deficiencies and disadvantages of the prior art devices and methods of this kind, and which method is simple to carry out and with which a gas-turbine blade for use at high temperatures can be manufactured. It is a further object of the invention to specify a gas-turbine blade of appropriate configuration.

With the above and other objects in view there is provided, in accordance with the invention, a method of manufacturing a gas-turbine blade, which comprises the following steps:

casting a hollow, supporting metal blade body with a blade airfoil having an outer surface and a hollow interior space;

forming a multiplicity of elevations with top surfaces on the outer surface of the blade airfoil;

boring impact cooling bores between the elevations from the outer surface to the hollow interior space;

applying a coating of a heat-resistant, removable material and thereby filling intermediate spaces between the elevations and closing the impact cooling bores;

applying a covering coat adhering to the top sides of the (metallically bright) elevations; and removing the material from the intermediate spaces between the elevations and the covering coat.

The invention is based on the idea that the cooling-air feed to the outer covering coat is to be as intensive as possible so that the gas-turbine blade manufactured according to the method can be operated at very high temperatures, i.e. at more than 1250° C. This is achieved in that the covering coat is connected to the blade airfoil only in a spot-like manner via, in particular peg-like, elevations, so that there is a large, free intermediate space between the covering coat and the outer surface of the supporting metal blade body. Cooling air is directed into the intermediate space through the impact cooling bores, and the inner surface of the covering coat is intensively cooled by impact cooling.

The elevations are configured in particular in such a way that the width between two adjacent elevations is greater than the width of the elevation itself. In addition to peg-like elevations, elongated elevations or elevations of a different kind or even elevations of various shapes together on the blade airfoil are possible in a development. By suitable selection of the geometry of the elevation and of the distribution of the elevations over the blade airfoil, the heat flow over the latter can be set in a specific manner. In this case, the distribution of the elevations depends on stability criteria with regard to the covering coat to be applied.

In accordance with an added feature of the invention, the elevations are cast simultaneously during the casting of the metal blade body, i.e. they are cast along with the latter. This saves additional operations and permits an especially reliable connection between the blade airfoil and the individual elevations.

The supporting metal blade body having the elevations (e.g., peg-like elevations) can be manufactured as a casting in a highly precise manner, and the boring or drilling of the impact cooling bores can likewise be carried out in a simple manner, preferably by means of a laser beam.

The heat-resistant and removable material which fills the intermediate spaces is preferably a ceramic material, which is dried and sintered after the application. This ceramic material may be the material which is also used as core material during the casting of the hollow, supporting metal blade body. In particular, this material is also leachable.

In order to obtain reliable adhesion between the covering coat to be applied and the top sides of the elevations, the surface of the coated metal blade body, after the drying and sintering of the coating, may be machined by grinding, so that the top sides of the elevations are exposed in a metallically bright state.

The application of a metal covering coat may be effected in a vacuum by electron-beam vaporization, whereas covering-coat materials which may also be non-metallic can also be applied by plasma spraying. A metal covering coat is distinguished by the fact that it has good thermal conductivity and ensures an intermetallic connection with the metallically bright top sides of the elevations. An additional oxidation and corrosion inhibiting coat may also be applied to this metal covering coat.

The connection between the covering coat and the metallically bright top sides of the elevations of the blade body can be improved by a heat treatment. Diffusion processes, which produce a reliable, intermetallic connection between the covering coat and the metal blade body, are activated by the heat treatment.

To cool the outer surface, exposed to the hot gases, of the covering coat, the latter may be formed with a multiplicity of oblique film-cooling bores. During the operation of the component, the discharging cooling air then forms a cooling film which flows along the outer surface.

The outer surface of the blade can then be precision-machined and/or smoothed. After that, if need be, it may also be given a further ceramic coating, e.g. consisting of a $ZrO_2$ coat, which is at least partly stabilized with yttrium. Such a ceramic coating may also be applied to the inner surface of the hollow, supporting metal blade body.

With the above and other objects in view there is also provided, in accordance with the invention, a gas-turbine blade, comprising:

a hollow, supporting metal blade body having a blade airfoil with an outer surface formed with a multiplicity of elevations;

the blade airfoil having a multiplicity of impact cooling bores formed therein between the elevations; and a thin covering coat adhering to the top sides of the elevations.

The covering coat has a thickness of between 0.1 mm and 0.5 mm and/or the elevations are shaped as pegs.

This novel gas-turbine blade satisfies the objects of the invention, namely to solve the problem, mentioned above, concerning the high-temperature resistance and the ease of manufacture.

The covering coat may preferably be formed with a multiplicity of oblique film-cooling bores. The thickness of the covering coat is preferably between about 0.1 mm and 0.5 mm, in particular between 180 $\mu$m and 300 $\mu$m. Cooling air flowing through the impact cooling bores cools the inner surface of the covering coat by impact cooling. The cooling air discharges at least partly through the oblique film-cooling bores onto the outer surface of the covering coat and forms a cooling film. The impact regions of the impact cooling air are preferably offset from the inlet openings of the film-cooling bores, e.g. by between one quarter or half the spacing of the impact cooling bores. In this case, the covering coat may be made of metal and be provided, if need be, with an additional oxidation and corrosion coat, e.g. a so-called MCrAlY alloy. In addition to the outer surface, the inner surface of the hollow blade body may also be provided with a ceramic coating. The inner surface is preferably covered with a protective coat, in particular chromated or alitized. The elevations are preferably peg-like.

Other features which are considered as characteristic for the invention are set forth in the appended claims.

Although the invention is illustrated and described herein as embodied in a gas-turbine blade and a method of manufacturing a gas-turbine blade, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
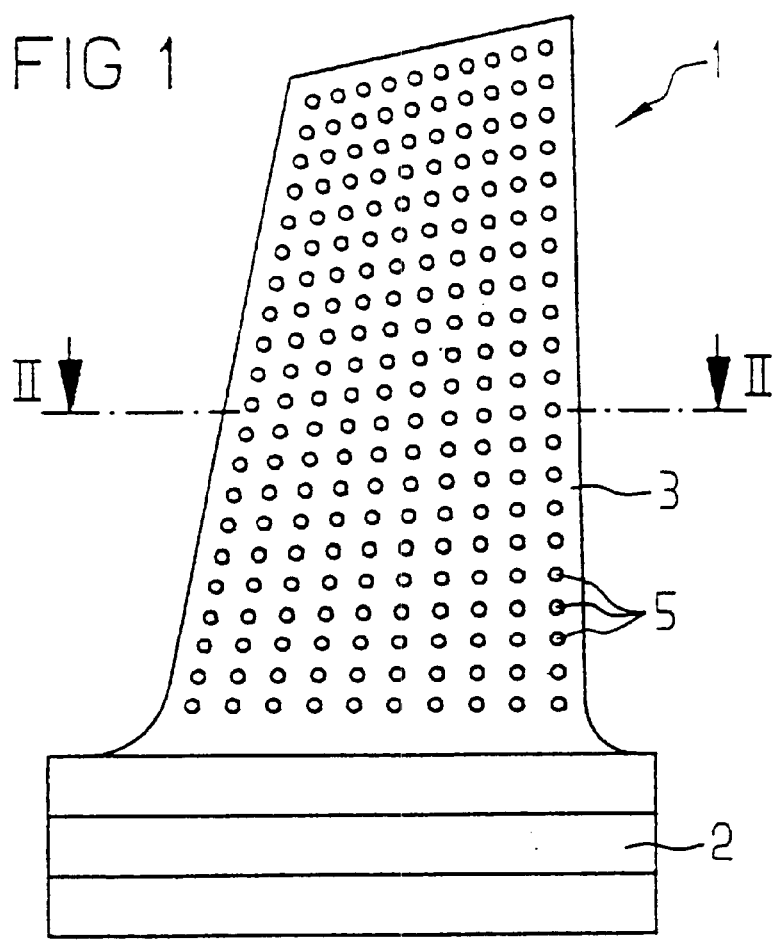
FIG. 1 is a side elevation of a cast, hollow, supporting metal blade body.
Figure 2:
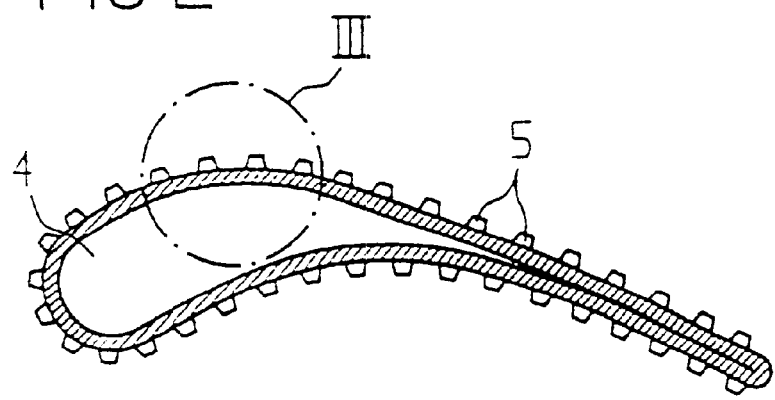
FIG. 2 is a section through the blade airfoil taken along the line II—II in FIG. 1 and viewed in the direction of the arrows.

Referring now to the figures of the drawing in detail, the individual production steps in the manufacture of a gas-turbine blade according to the invention follow from FIGS. 1 to 5. First of all, as shown in FIG. 1 in side view and in the cross-section of FIG. 2, a hollow, supporting metal blade body 1, for example made of a high-temperature-resistant nickel alloy, is cast by an precision casting process. The metal blade body 1 consists of a blade root 2 and a blade airfoil 3 formed with a hollow interior space 4. A multiplicity of peg-like elevations 5 are arranged on the outer surface of the blade airfoil 3.

Figure 3:
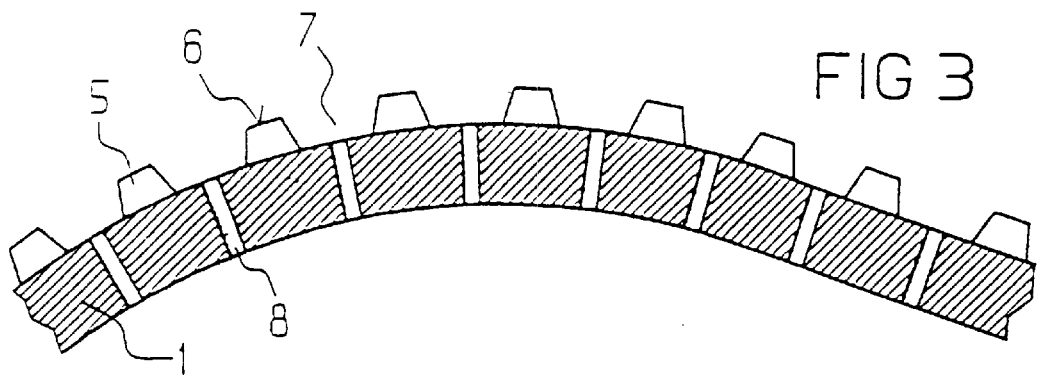
FIG. 3 is an enlarged partial cross sectional view of the wall of the hollow, supporting metal blade body.

With reference to FIG. 3, after the casting of the metal blade body 1, a multiplicity of impact cooling bores 8 are formed between the peg-like elevations 5. This can be effected, for example, by laser-beam drilling.

Figure 4:
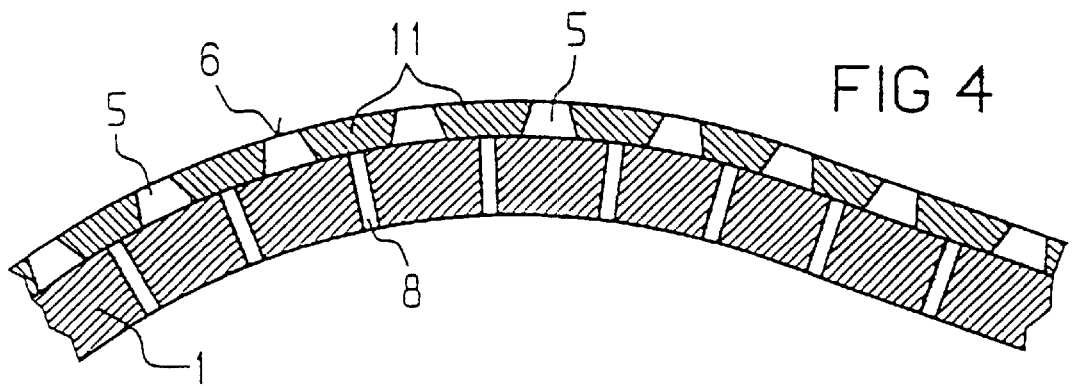
FIG. 4 is an enlarged partial cross sectional view of the wall of a hollow, supporting metal blade body after the application of a leachable coating.

Then the intermediate spaces 7 between the elevations 5 are filled with a heat-resistant, leachable material. In the process, the impact cooling bores 8 are closed, as shown in FIG. 4. This coating 11 may be made of a ceramic material, as also used as core material during the casting of the hollow, supporting metal blade body 1. The coating 11 has a thickness which corresponds to the height of the peg-like elevations 5, so that the top surfaces 6 of the elevations 5 are exposed. If need be, the surface of the metal blade body 1 having the leachable coating 11, after the drying and sintering of the coating 11, is machined by grinding in such a way that the top sides 6 of the elevations 5 are present in a clean and metallically bright state within the coating 11.

Figure 5:
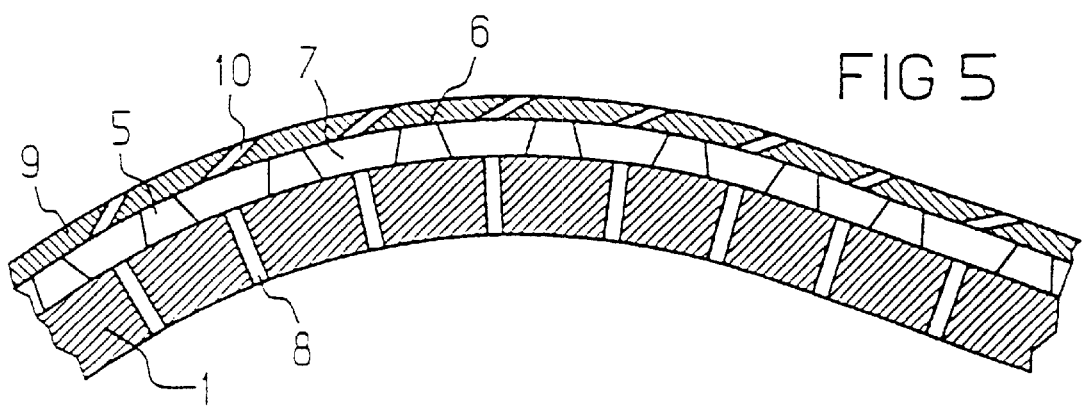
FIG. 5 is an enlarged partial cross sectional view of a wall of a finished gas-turbine blade.

At this point, the coated blade element 1 is placed in an apparatus for the application of a covering coat 9. FIG. 5 shows the applied covering coat 9. The latter is preferably also made of a high-temperature-resistant metal, for example of the same metal from which the metal blade body 1 was cast. The application of the covering coat 9 may be effected in a vacuum by electron-beam vaporization. The process is described in the paper "Advanced Airfoil Fabrication," cited above, and is especially suitable for the application of a metal covering coat 9.

The covering coat 9 can also be applied by plasma spraying. The application of non-metallic covering coats is also possible in this case.

If need be, it is further possible to apply an additional oxidation and corrosion-inhibiting coat as a second layer to the metal covering coat 9.

Diffusion processes, which produce reliable bonding of the covering coat 9 with the top sides 6 of the elevations 5, can be activated by a subsequent heat treatment.

In order to expose the intermediate spaces 7 after the application of the covering coat 9, the coating 11 is removed by means of conventional processes. Leaching is particularly suitable.

Before or after the leaching, oblique film-cooling bores 10 may be formed in the covering coat 9. This ensures that, during operation, at least some of the cooling air passing through the impact cooling bores 8 into the intermediate spaces 7 discharges through the oblique film-cooling bores 10 onto the outer surface of the gas-turbine blade and forms a film-cooling layer on the outer surface.

If need be, subsequent precision machining and/or smoothing of the outer surface of the blade may be carried out. A finished gas-turbine blade having a hollow, supporting metal blade body 1 and a thin, outer wall which is readily cooled and can be favorably designed aerodynamically is then available.

We claim:

1. A method of manufacturing a gas-turbine blade, which comprises the following steps:

casting a hollow, supporting metal blade body with a blade airfoil having an outer surface and a hollow interior space;

forming a multiplicity of elevations with top sides on the outer surface of the blade airfoil;

boring impact cooling bores between the elevations from the outer surface to the hollow interior space;

applying a coating of a heat-resistant, removable material and thereby filling intermediate spaces between the elevations and closing the impact cooling bores;

applying a covering coat adhering to the top sides of the elevations;

boring a multiplicity of oblique film-cooling bores in the covering coat; and removing the heat-resistant, removable material from the intermediate spaces between the elevations and the covering coat.

2. The method according to claim 1, which comprises rendering the top sides of the elevations metallically bright prior to the step of applying the covering coat.

3. The method according to claim 1, which comprises forming the elevations during the casting step.

4. The method according to claim 3, wherein the elevations are formed as peg-shaped elevations.

5. The method according to claim 1, wherein the boring step comprises forming the impact cooling bores with a laser beam.

6. The method according to claim 1, wherein the step of applying the covering coat comprises applying a metal covering coat in a vacuum by electron-beam vaporization.

7. The method according to claim 1, wherein the step of applying the covering coat comprises applying the covering coat by plasma spraying.

8. The method according to claim 1, which further comprises applying an oxidation and corrosion inhibiting coat in addition to the metal covering coat.

9. The method according to claim 1, which comprises subjecting the outer surface of the blade to a finishing process selected from the group of precision-machining and smoothing.

10. The method according to claim 1, which comprises forming a ceramic protective coat on at least one of the hollow space of the blade body and the outer surface of the blade.

11. A method of manufacturing a gas-turbine blade, which comprises the following steps:

casting a hollow, supporting metal blade body with a blade airfoil having an outer surface and a hollow interior space;

forming a multiplicity of elevations with top sides on the outer surface of the blade airfoil;

boring impact cooling bores between the elevations from the outer surface to the hollow interior space;

applying a coating of a heat-resistant, removable material and thereby, filling intermediate spaces between the elevations and closing the impact cooling bores;

applying a covering coat adhering to the top sides of the elevations; and leaching the heat-resistant, removable material from the intermediate spaces between the elevations and the covering coat.

12. A method of manufacturing a gas-turbine blade, which comprises the following steps:

casting a hollow, supporting metal blade body with a blade airfoil having an outer surface and a hollow interior space;

forming a multiplicity of elevations with top sides on the outer surface of the blade airfoil;

boring impact cooling bores between the elevations from the outer surface to the hollow interior space;

applying a coating of a ceramic material and thereby filling intermediate spaces between the elevations and closing the impact cooling bores, and drying and sintering the ceramic material;

applying a covering coat adhering to the top sides of the elevations; and removing the ceramic material from the intermediate spaces between the elevations and the covering coat.

13. The method according to claim 12, which comprises, after drying and sintering, machining the surface of the coated metal blade body by grinding and thereby exposing the top sides of the elevations in a metallically bright state.

14. A method of manufacturing a gas-turbine blade, which comprises the following steps:

casting a hollow, supporting metal blade body with a blade airfoil having an outer surface and a hollow interior space;

forming a multiplicity of elevations with top sides on the outer surface of the blade airfoil;

boring impact cooling bores between the elevations from the outer surface to the hollow interior space;

applying a coating of a heat-resistant, removable material and thereby filling intermediate spaces between the elevations and closing the impact cooling bores;

applying a covering coat adhering to the top sides of the elevations;

removing the heat-resistant, removable material from the intermediate spaces between the elevations and the covering coat; and subjecting the metal blade body with the covering coat to heat treatment for securely connecting the covering coat to the top sides of the elevations by diffusion.

15. A gas-turbine blade, comprising:

a hollow, supporting metal blade body having a blade airfoil with an outer surface having a multiplicity of elevations with top sides formed thereon;

said blade airfoil having a multiplicity of impact cooling bores formed therein between said elevations; and a thin covering coat adhering to said top sides of said elevations, said covering coat having a thickness of between 0.1 mm and 0.5 mm, said covering coat having a multiplicity of oblique film-cooling bores formed therein.

16. The gas-turbine blade according to claim 15, wherein said covering coat is a metal covering coat.

17. The gas-turbine blade according to claim 15, which comprises an additional oxidation and corrosion inhibiting coat on said airfoil blade.

18. The gas-turbine blade according to claim 15, which further comprises additional, inner ceramic coating.

19. A gas-turbine blade, comprising:

a hollow, supporting metal blade body having a blade airfoil with an outer surface having a multiplicity of peg-shaped elevations with top sides formed thereon;

said blade airfoil having a multiplicity of impact cooling bores formed therein between said peg-shaped elevations; and a thin covering coat adhering to said top sides of the elevations, said covering coat having a multiplicity of oblique film-cooling bores formed therein.

20. The gas-turbine blade according to claim 19, wherein said covering coat is a metal covering coat.

21. The gas-turbine blade according to claim 19, which comprises an additional oxidation and corrosion inhibiting coat on said airfoil blade.

22. The gas-turbine blade according to claim 19, which further comprises additional, inner ceramic coating.

* * * * *